(12) United States Patent
Ohsawa

(10) Patent No.: US 9,142,027 B2
(45) Date of Patent: Sep. 22, 2015

(54) IMAGE PROCESSING APPARATUS, IMAGE PROCESSING METHOD, AND COMPUTER PROGRAM

(71) Applicant: CANON KABUSHIKI KAISHA, Tokyo (JP)

(72) Inventor: Shinnosuke Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/102,031

(22) Filed: Dec. 10, 2013

(65) Prior Publication Data

US 2014/0169689 A1   Jun. 19, 2014

(30) Foreign Application Priority Data

Dec. 19, 2012  (JP) ................................. 2012-277035

(51) Int. Cl.
*G06T 7/00* (2006.01)
*H04N 5/232* (2006.01)

(52) U.S. Cl.
CPC .......... *G06T 7/0081* (2013.01); *H04N 5/23212* (2013.01); *G06T 2207/10024* (2013.01); *G06T 2207/10028* (2013.01); *G06T 2207/20144* (2013.01)

(58) Field of Classification Search
CPC ................... G06T 7/0081; G06T 2207/20144; G06T 2207/10028; G06T 2207/10024; G06T 7/0079; G06K 2009/2045; G06K 9/6267; G06K 9/34; H04N 5/23212
USPC .......................................... 382/173, 224, 231
See application file for complete search history.

(56) References Cited

U.S. PATENT DOCUMENTS

| | | | |
|---|---|---|---|
| 7,424,151 B2 * | 9/2008 | Lin et al. ........................ | 382/173 |
| 8,867,820 B2 * | 10/2014 | Peeper et al. .................. | 382/154 |
| 2011/0069866 A1 * | 3/2011 | Kim et al. ..................... | 382/103 |
| 2013/0057654 A1 * | 3/2013 | Rafii et al. ..................... | 348/46 |

FOREIGN PATENT DOCUMENTS

JP   2009-110137 A   5/2009

* cited by examiner

*Primary Examiner* — Edward Park
(74) *Attorney, Agent, or Firm* — Cowan, Liebowitz & Latman, P.C.

(57) ABSTRACT

An image processing apparatus groups distance measurement areas for every group of distances close to each other based on a photographing distance obtained for each distance measurement area and assigns the same distance number to the distance measurement areas belonging to the same group. The image processing apparatus further divides a photographed image into a plurality of blocks to calculate an average value of hue of each block and sets a plurality of blocks having similar average values of hue among the blocks that are adjacent to one another as the same (one) color area. The image processing apparatus then divides the color area based on the distance number overlapping with the color area.

10 Claims, 7 Drawing Sheets

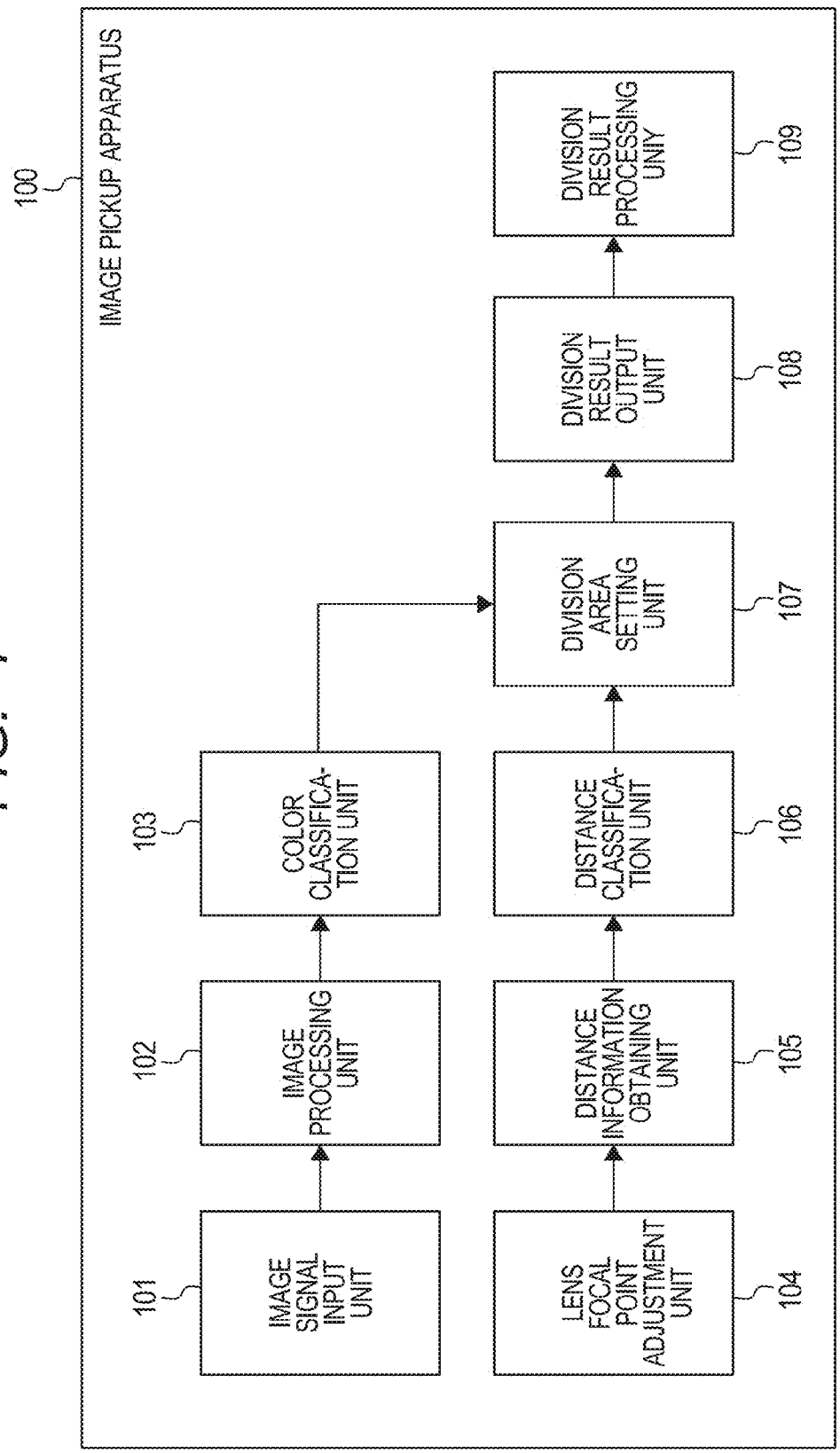

IMAGE PROCESSING APPARATUS, IMAGE PROCESSING METHOD, AND COMPUTER PROGRAM

BACKGROUND OF THE INVENTION

1. Field of the Invention

The present invention relates to an image processing apparatus, an image processing method, and a computer program, and more particularly, to an image processing apparatus and an image processing method, which are suitable for use in dividing a photographed image on photographing distance basis to process the photographed image.

2. Description of the Related Art

Along with the development in technique of a digital still camera, there is hitherto developed a technique of enhancing representational power of a photographed image by performing image processing on the photographed image. In Japanese Patent Application Laid-Open No. 2009-110137, there is disclosed a technique involving performing a shading process based on a photographing distance to a photographing target that is calculated for each partial area within an image pickup area. Specifically, in Japanese Patent Application Laid-Open No. 2009-110137, a plurality of distance measurement frames of a well-known contrast AF system are arranged on a picture image, among small areas divided in accordance with a color of an image or the like, small areas that have photographing distances close to each other, which distances are obtained as a result of distance measurement, are combined to extract an object, and a shading process is performed for each object. Japanese Patent Application Laid-Open No. 2009-110137 is described as being able to generate an image with more effective blurring expression like that made in a single lens reflex camera even in the photographing with a compact digital camera having a large depth of field by obtaining a result of area division according to the distance from the photographing target to an image pickup position as described above.

However, with the technique disclosed in Japanese Patent Application Laid-Open No. 2009-110137, other photographing targets having similar colors are undesirably treated as a single photographing target, and hence the same blurring amount is undesirably set for other photographing targets positioning at different distances. Accordingly, the result of the shading process contradicts the photographing distances in some cases up to now.

In addition, with the technique disclosed in Japanese Patent Application Laid-Open No. 2009-110137, when the photographing distance is determined for each of the small areas divided in accordance with the color of the image or the like, the photographing distance of a distance measurement frame in which the distance is erroneously measured is undesirably specified in some cases up to now. Accordingly, an appropriate area in which the small areas having substantially the same photographing distance are combined cannot be generated in some cases up to now.

SUMMARY OF THE INVENTION

The present invention is made in view of the above-mentioned problems, and an aspect of the invention is to enable accurate division of a photographed image in accordance with a photographing distance.

An image processing apparatus according to one aspect of the invention includes: a first classification unit that classifies image data into a plurality of first areas based on first information; a second classification unit that classifies the image data into a plurality of second areas based on second information that is different from the first information; and a division unit that divides at least one of the plurality of first areas into a plurality of areas based on the plurality of second areas.

Further features of the present invention will become apparent from the following description of exemplary embodiments with reference to the attached drawings.

BRIEF DESCRIPTION OF THE DRAWINGS

The accompanying drawings, which are incorporated in and constitute a unit of the specification, illustrate exemplary embodiments, features, and aspects of the invention and, together with the description, serve to explain the principles of the invention.

FIG. 1 is a diagram illustrating an example of a configuration of an image pickup apparatus.

DESCRIPTION OF THE EMBODIMENTS

Figure 2A:
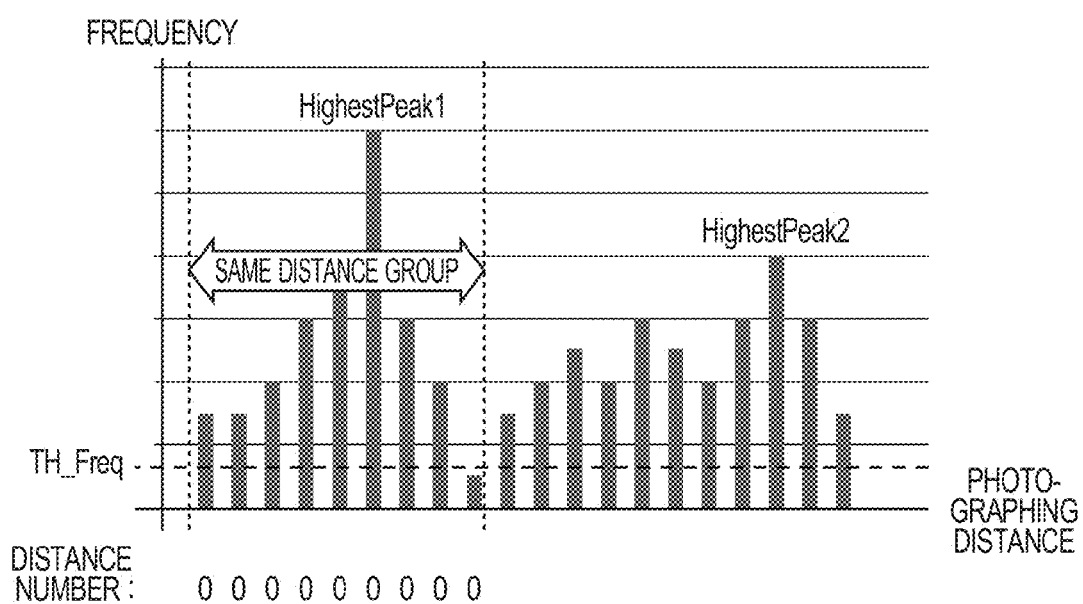
FIG. 2A is a graph illustrating a method of setting the same distance group based on a histogram having photographing distances as its elements.

Various exemplary embodiments, features, and aspects of the present invention will be described in detail below with reference to the drawings.

Configuration of Image Pickup Apparatus

In an embodiment of the present invention, a description is given by taking as an example a case where an image pickup apparatus including an image processing apparatus is a digital camera.

FIG. 1 is a block diagram illustrating an example of a functional configuration of an image pickup apparatus 100.

An image signal input unit 101 performs an image obtaining process of obtaining image information. To describe in detail, the image signal input unit 101 includes, for example, an optical unit constituted of a lens and the like, a charge coupled device (CCD) unit as an image pickup element, and an A/D conversion unit. The optical unit receives light entering the image pickup apparatus. The CCD unit outputs charges corresponding to the light amount received by the optical unit. The A/D conversion unit performs sampling, gain adjustment, A/D conversion, and the like on an analog image signal output from the CCD unit to generate a digital signal.

An image processing unit 102 performs various kinds of image processing on the digital image signal output from the image signal input unit 101 to output the digital image signal on which the image processing is performed. For example, the image processing unit 102 performs the image processing including a process of converting the digital image signal into a YUV image signal to output the YUV image signal.

A color classification unit 103 divides an image obtained by the image processing unit 102 into a plurality of color areas, each of which is an example of a second area. Each of the color areas is, for example, constituted of a single block including a plurality of pixels or constituted by combining a plurality of blocks each including a plurality of pixels.

The following method is given as an example of a method of dividing the image into the plurality of color areas. First, the image is divided into a plurality of blocks. Next, the same color number is set for at least two blocks having similar average values of hue among a plurality of blocks that are adjacent to one another. Then, grouping of at least two blocks for which the same color number is set into the same group is performed, and the blocks obtained by the grouping are determined as one color area. Note that it is desirable that the size of each block be a size large enough to properly perform image processing to be performed on an extracted area and have such a dimension that the average value of hue of the block is not affected by noise or the like. More preferably, for example, it is desired that a picture image be divided into 40 blocks in height and 30 blocks in width at equal intervals.

A lens focal point adjustment unit 104 adjusts a focus of the lens included in the image pickup apparatus 100. A distance information obtaining unit 105 arranges a plurality of distance measurement areas each having a predetermined size on the image pickup apparatus 100 and image data, and obtains a photographing distance, which is a distance between a predetermined position of the image pickup apparatus 100 (the image pickup element in this embodiment) and a photographing target, for each distance measurement area. Specifically, for example, distance information obtaining unit 105 obtains the photographing distance as an example of distance information by the following method. First, the distance information obtaining unit 105 obtains, in accordance with the adjustment of the focal point of the lens performed by the lens focal point adjustment unit 104, a plurality of reduced images of the images picked up by the image pickup apparatus 100 by changing focal distances, so that a process speed can be enhanced by obtaining the reduced images.

Next, the distance information obtaining unit 105 divides each of the plurality of reduced images having different focal points on the distance measurement area basis, and calculates a total value of contrast values of the distance measurement area obtained by division.

It is desirable that the size of each distance measurement area be a size large enough to properly perform the image processing to be performed on an extracted area and have such a dimension that a photographing target is prevented from vibrating across the boundary of the distance measurement area due to camera shaking or the like during focus lens adjustment. More preferably, it is desired that the screen be divided into 20 blocks in height and 15 blocks in width at equal intervals. In this case, the number of the distance measurement areas obtained by division is smaller than the number of color areas obtained by division.

It is also desirable that the respective blocks and distance measurement areas be arranged so that each boundary between the distance measurement areas as an example of a first area is identical with each boundary between the blocks as an example of a third area.

The distance information obtaining unit 105 then compares the contrast values of the distance measurement areas of the a plurality of reduced images that are located in the same position with one another, to identify the reduced image having the largest contrast value, and determines that the corresponding distance measurement area is in focus in the identified reduced image. The distance information obtaining unit 105 further determines that the distance measurement area having the largest contrast value is an in-focus distance measurement area. Finally, the distance information obtaining unit 105 calculates the photographing distance (distance from the image pickup element to the photographing target) for each distance measurement area based on a focal position of the reduced images that is determined for distance measurement areas, as having the largest contrast value. This photographing distance can be calculated based on a positional relationship of the lenses obtained at a time when the image pickup element of the image pickup apparatus 100 is in a focal plane. Moreover, the distance information obtaining unit 105 calculates, for each distance measurement area, a difference in the photographing distance of the in-focus distance measurement area.

Figure 2B:
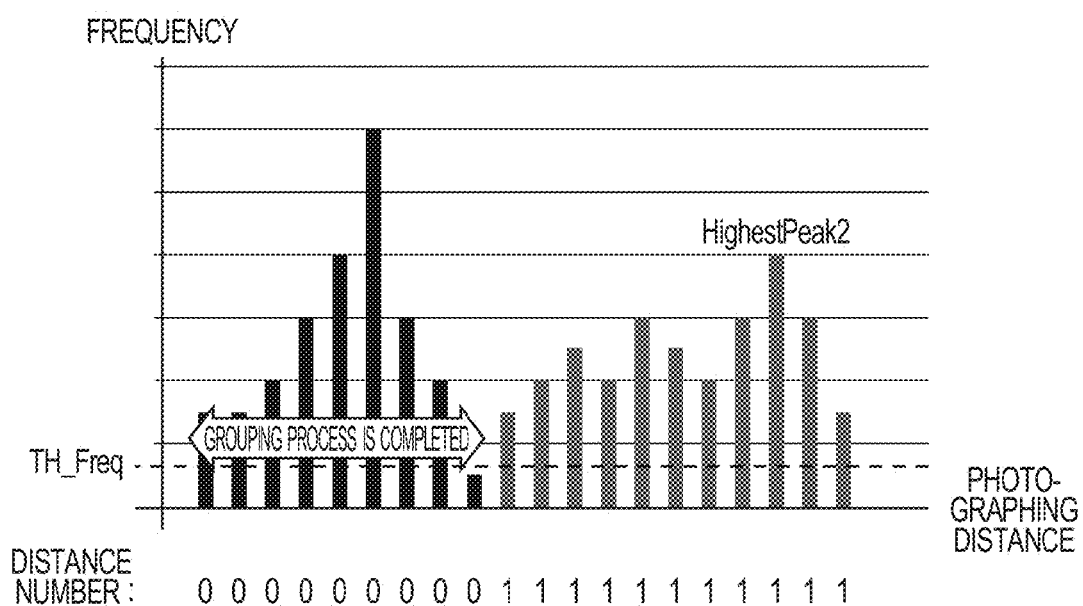
FIG. 2B is a graph illustrating a method of additionally setting the distance group.

A distance classification unit 106 performs grouping of the distance measurement areas based on the photographing distance of each of the distance measurement areas obtained by the distance information obtaining unit 105. Specifically, in this embodiment, the distance classification unit 106 performs grouping of the distance measurement areas by the following method. First, the distance classification unit 106 creates a histogram having the photographing distances of the respective distance measurement areas as its elements. FIG. 2A is a graph illustrating a method of setting the same distance group based on the histogram having the photographing distances as its elements, and FIG. 2B is a graph illustrating a method of additionally setting the distance group.

The distance classification unit 106 scans all the photographing distances of the histogram to find a highest frequency HighestPeak1 (see FIG. 2A). Next, the distance classification unit 106 scans the histogram from the photographing distance having the found frequency HighestPeak1 downwardly on left and right sides of the peak. The distance classification unit 106 then determines a section of the histogram that corresponds to one of (A) and (B) as the same distance group.

(A) Section ranging from the photographing distance having the frequency HighestPeak1 to the photographing distance at which frequency becomes smaller than a threshold value TH_Freq for the first time (B) Section ranging from the photographing distance having the frequency HighestPeak1 until a position at which distance from the photographing distance in the histogram reaches a predetermined value The distance classification unit 106 performs grouping of the distance measurement areas whose photographing distances are included in the above-mentioned section as the same area, and sets a unique distance number for the same area obtained by the grouping. The distance classification unit 106 further records the section as the section on which a grouping process is completed.

Next, the distance classification unit 106 scans again all sections of the histogram excluding the section on which the grouping process is completed to find a highest frequency HighestPeak2 among the frequencies of those sections (see FIG. 2B), and then repeats the same operation.

When the histogram is scanned from the highest frequency HighestPeak2 downwardly, in case where the scanning reaches the section on which the grouping process is completed, before reaching the photographing distance whose frequency is the threshold value TH_Freq or smaller, the section up to the reached photographing distance is set as the same section. This series of operation is repeated until all the photographing distances of the histogram belong to any of the distance groups (until all the photographing distances are recorded as the ones on which the grouping process is completed). With this process, it is possible to perform grouping of the respective distance measurement areas for every group of photographing distances close to each other. The grouping of the distance measurement areas and the setting of the distance number to each group as described above are determined as a result of the distance classification.

A division area setting unit 107 divides an area for every group of photographing distances close to each other, in accordance with a result of the division into the color areas performed by the color classification unit 103 and a result of the setting of the distance number performed by the distance classification unit 106, to obtain a divisional area having a higher resolution than that of the result of the distance classification. Specifically, for example, the following method is used.

First, in order to obtain the divisional area, the division area setting unit 107 prepares a division plane on which an index of the distance number of each block can be stored. Next, the division area setting unit 107 determines a representative distance number for each color area obtained by the division by the color classification unit 103.

For example, the representative distance number is determined as follows.

First, in a case where there are sets of a plurality of distance measurement areas each having different distance numbers overlap with a color area, the division area setting unit 107 calculates a rate of a planar dimension (hereinafter referred to as "area rate") of the distance measurement areas having the same distance number for each color area. Next, if the largest area rate among the calculated area rates is larger than a threshold value TH_AREA_RATE, which corresponds to the area rate at which distance measurement areas occupy the most part of the color area, the division area setting unit 107 determines the distance number corresponding to the largest area rate as the representative distance number. In this manner, even if an erroneous distance measurement area is included in the distance measurement areas within the color area, an appropriate distance number can be determined as the representative distance number.

Subsequently, the division area setting unit 107 inputs the value to the division plane by the following method. The division area setting unit 107 assigns the representative distance number to the entire color area whose representative distance number is determined. The division area setting unit 107 assigns the result of the distance classification to the division plane as it is, with respect to the color area having no distance number that satisfies the condition for determining the corresponding distance number as the representative distance number (condition that the largest area rate is larger than the threshold value TH_AREA_RATE).

The division area setting unit 107 determines the division plane created by the above-mentioned method as the divisional area. In this manner, it is possible to obtain the result of the distance classification in which the same distance number is set to an area of the same photographing target even if there are areas having different colors in the same photographing target. It is also possible to obtain the result of the distance classification in which other photographing targets having similar colors and having different photographing distances are separated from one another.

A division result output unit 108 outputs the divisional area created by the division area setting unit 107.

Based on the divisional area output from the division result output unit 108, a division result processing unit 109 uses, for each area having the same distance number assigned to the division plane, a blurring function that varies in accordance with the photographing distance to perform a shading process. The division result processing unit 109 then combines areas on which the shading process is performed, to generate image data. The image data generated by the division result processing unit 109 is displayed on an electronic viewfinder included in the image pickup apparatus 100, stored in a storage medium set into the image pickup apparatus 100, or transmitted to an external apparatus.

Note that, a part or all of the color classification unit 103 and the distance classification unit 106 to the division result processing unit 109 may be realized by individual pieces of hardware, or may be realized by means of software by a programmable processor included in the image processing unit 102. The programmable processor included in the image processing unit 102 reads out a computer program for executing the processes of those units from a memory (not shown) connected thereto to execute the processes.

Figure 3:
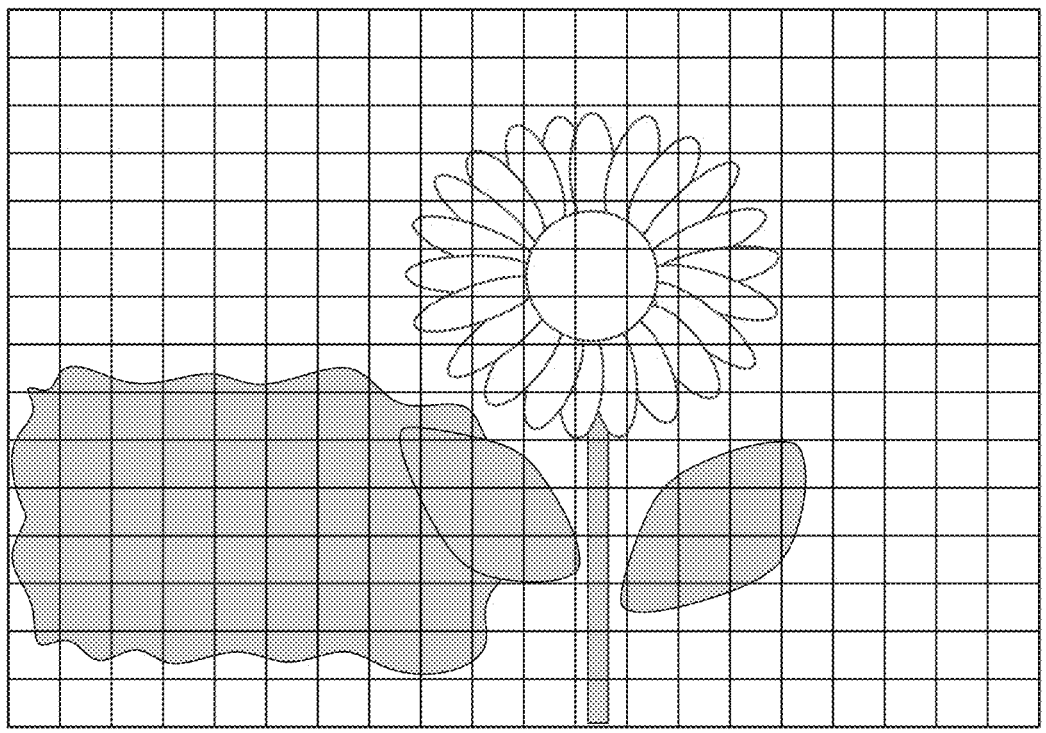
FIG. 3 is a diagram illustrating an example of a photographing scene.

FIG. 3 is a diagram illustrating an example of a photographing scene according to the embodiment of the present invention. In this example, a description is given of an area extracting process performed on the photographing scene illustrated in FIG. 3.

Figure 4:
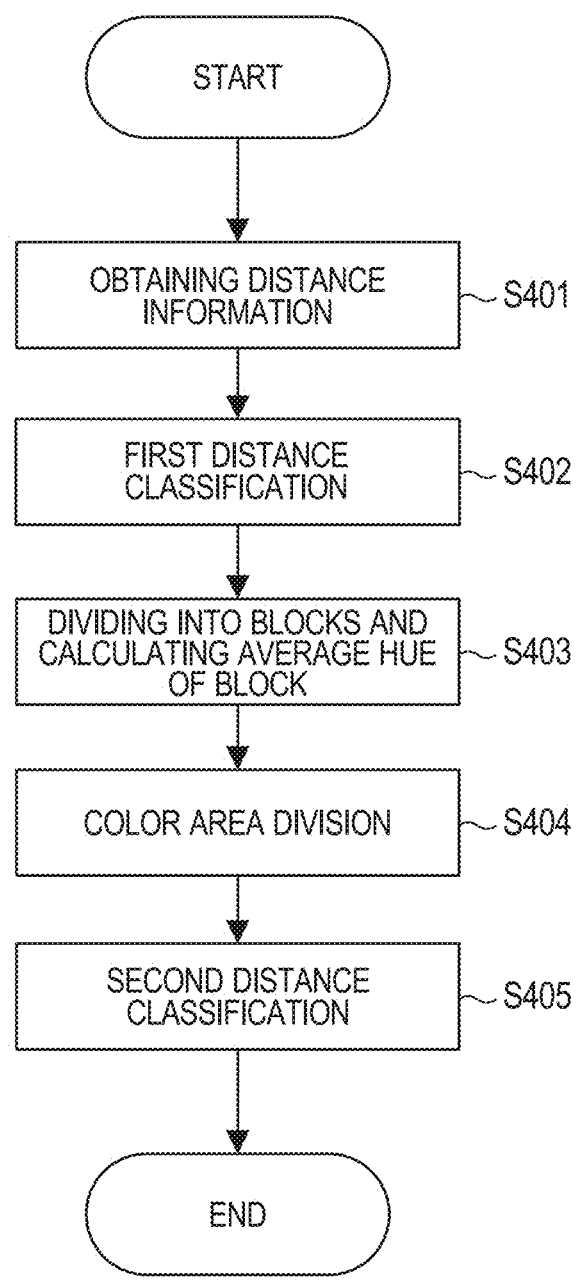
FIG. 4 is a flowchart illustrating a photographing target area extracting process.

FIG. 4 is a flowchart illustrating an example of a photographing target area extracting process performed by the image pickup apparatus 100 of this embodiment.

Step S401

The distance information obtaining unit 105 obtains the photographing distance for each distance measurement area of a photographing target in accordance with the "adjustment of the focus by moving the lens," which is performed by the lens focal point adjustment unit 104. Rectangles each surrounded by the solid lines of FIG. 3 indicate the respective 20×15 distance measurement areas.

Step S402

Figure 5:
FIG. 5 is a diagram illustrating an example of a result obtained by grouping of respective distance measurement areas.

The distance classification unit 106 performs grouping of the distance measurement areas for every group of the photographing distances close to each other based on the photographing distance obtained for each distance measurement area. FIG. 5 is a diagram illustrating an example of a result obtained by performing the grouping of the distance measurement areas (distance numbers). Numbers indicated in the rectangles of FIG. 5 represent the different distance numbers. In FIG. 5, partly in an inside of flower 501, there are areas having a different grouping result due to an erroneous distance measurement (areas assigned with a different distance number). The erroneous distance measurement often occurs in a case where a noise amount of the image is large, a case where the contrast of the photographing target is low, or other such cases, when the focal distance for achieving an in-focus state is obtained by a contrast AF system. Moreover, at an edge of flower 502, there are distance measurement areas erroneously assigned with the distance number of a background due to background focusing.

Step S403

Next, the color classification unit 103 divides the image obtained by the image processing unit 102 into 40×30 blocks and calculates the average value of hue for each block.

Step S404

Subsequently, the color classification unit 103 performs color area division of grouping of a plurality of blocks having similar average values of hue (whose average values of hue fall within a predetermined range) among the blocks that are adjacent to one another into the same group.

Step S405

Finally, the division area setting unit 107 obtains the divisional area in accordance with a result of the color area division in Step S404 and a result of the distance classification in Step S402.

Figure 6A:
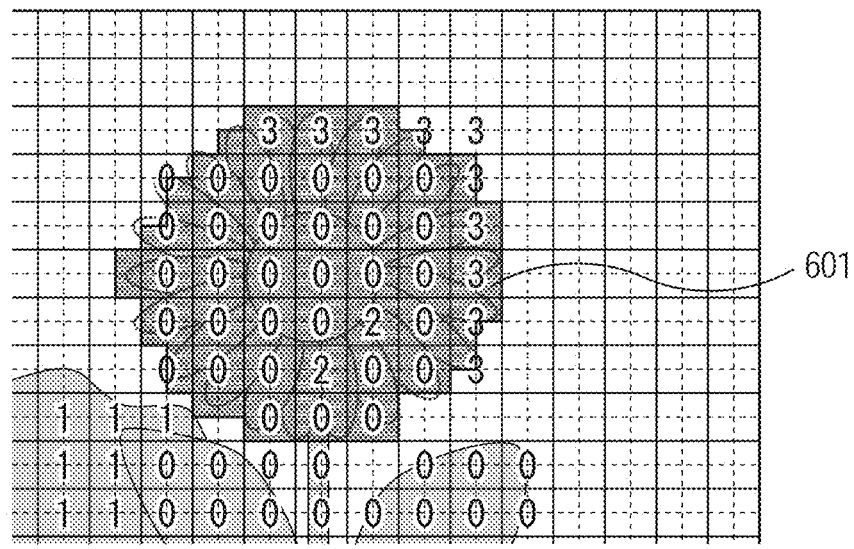
FIG. 6A is a diagram illustrating a distance number corresponding to one color area.
Figure 6B:
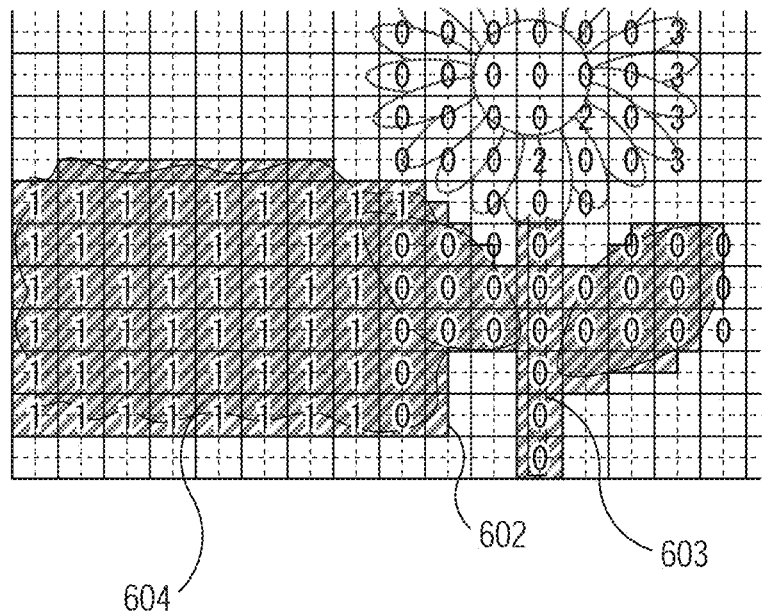
FIG. 6B is a diagram illustrating a distance number corresponding to another color area.

FIGS. 6A and 6B are diagrams illustrating an example of a process for obtaining the divisional area (final area extraction result).

Specifically, FIG. 6A is a diagram illustrating the distance numbers corresponding to a color area 601.

In the color area 601, as described above, there are distance measurement areas assigned with the erroneous distance number of "2" due to the erroneous distance measurement within the color area (see FIG. 5). Moreover, in the color area 601, there are distance measurement areas assigned with the erroneous distance number of "3" of the background due to the background focusing (see FIG. 5). On the other hand, the distance numbers that occupy the most part of the color area 601 are "0". It is assumed here that the area rate of the distance measurement areas having the distance number of "0" is larger than the threshold value TH_AREA_RATE of the area rate, which is used for determining that corresponding distance measurement areas occupy the most part of the color area. Thus, the representative distance number of the color area 601 is determined as "0".

FIG. 6B is a diagram illustrating the distance numbers corresponding to a color area 602. As illustrated in FIG. 6B, stem and leaves 603 as a photographing target A and a hedge 604 as a photographing target B are other photographing targets having different photographing distances. It is therefore desired that the stem and leaves 603 as the photographing target A and the hedge 604 as the photographing target B be divided into different distance groups. However, because the stem and leaves 603 as the photographing target A and the hedge 604 as the photographing target B have similar hues, those photographing targets are undesirably included in the same color area 602. If the only distance number is undesirably assigned to the color area 602 as it is with the technique disclosed in Japanese Patent Application Laid-Open No. 2009-110137, the above-mentioned desirable divisional area cannot be obtained.

In contrast, in this embodiment, in a case where there is no distance number whose area rate is larger than the threshold value TH_AREA_RATE of the area rate, which is used for determining that corresponding distance measurement areas occupy the most unit of the color area 602, the result of the distance classification is used as it is, as the divisional areas. In this manner, it is possible to obtain the above-mentioned desirable divisional areas in which other photographing targets having similar colors and having different photographing distances are separated from one another.

Figure 7:
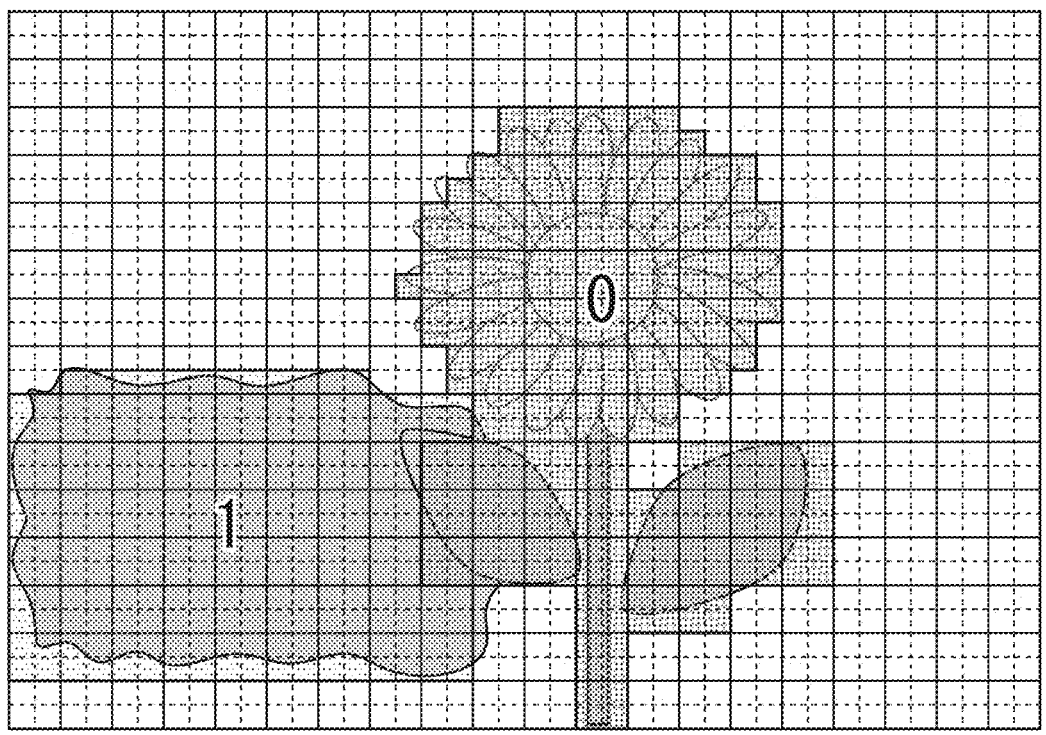
FIG. 7 is a diagram illustrating a final area extraction result.

Through the process described above, the divisional areas as the final area extraction result are as illustrated in FIG. 7.

As described above, in this embodiment, the grouping of the distance measurement areas is performed for every group of photographing distances close to each other based on the photographing distance obtained for each distance measurement area, and the same distance number is assigned to the distance measurement areas belonging to the same group. Further, the photographed image is divided into a plurality of blocks to calculate the average value of hue for each block, and sets the same color number for a plurality of blocks having similar average values of hue among the blocks that are adjacent to one another. Further, adjacent blocks having the same color number are set as the same (one) color area. The area rate of the distance measurement areas having the same distance number is calculated for each color area, and if the largest area rate is larger than the threshold value, the distance number for the color area is set to the representative distance number corresponding to the distance measurement areas having the largest area rate. It is therefore possible to obtain a suitable result of area division even if there is a distance measurement area whose distance is erroneously measured in the color area.

In addition, in each color area, if the above-mentioned largest area rate is the threshold value or smaller, the distance number for the color area is set to the distance number assigned to each of the distance measurement areas included in the color area. It is therefore possible to obtain a suitable result of area division even if there are different photographing targets having similar colors and having the photographing distances close to each other.

Alternatively, the distance measurement areas adjacent to one another for which the same distance number is set may be set as the same distance area, and an area rate of blocks having the same color number may be calculated for each distance area to set the divisional area. However, it is desirable in this case that the number of color areas obtained by division be smaller than the number of distance measurement areas obtained by division.

As described above, in this embodiment, it is possible to accurately and finely divide the photographed image based on the photographing distance, and it is accordingly possible to obtain a suitable result of area division.

In this embodiment, the area rate of the distance measurement areas having the same distance number is calculated for each color area, and when the largest value of the area rate is larger than the threshold value TH_AREA_RATE, the distance number corresponding to the largest area rate is set as the representative distance number. However, a method of determining the representative distance number is not limited to the above-mentioned method. For example, the following method may be adopted. Specifically, a priority is set in accordance with the distance from a reference position, and for each color area, the distance number indicating the distance having a higher priority among the distance numbers included in the color area is selected, and then the selected distance number is set as the representative distance number. As an example, in a case where a position of the image pickup apparatus (camera) is set as the reference position and a higher priority is assigned to the distance number corresponding to the closer photographing distance from the camera, it is possible to prevent such an error that a part of the photographing target closer to the camera is classified into a different group.

Further, in this embodiment, the grouping of a plurality of blocks having similar average values of hue (whose average values of hue fall within a predetermined range) among the blocks that are adjacent to one another into the same group is performed, and the area of a plurality of blocks obtained by the grouping is determined as the same color area. A method of creating the color area is not limited to the above-mentioned method. For example, grouping of a plurality of blocks having similar average values of luminance (whose average values of luminance fall within a predetermined range) among the blocks that are adjacent to one another into the same group may be performed, and the area of a plurality of blocks obtained by the grouping may be determined as the same color area. Alternatively, grouping of a plurality of blocks having similar average values of hue and similar average values of luminance both (whose average values of hue and average values of luminance both fall within the respective predetermined ranges) into the same group may be performed. In this manner, it is possible to create the color area based on a signal value of the pixel of each block (at least one of hue or luminance in this case).

Further, in this embodiment, if none of the area rates of the distance measurement areas each having the same distance number is larger than the threshold value in the color area, the distance number for the color area is set to the distance number assigned to each of the distance measurement areas included in the color area. However, a method of keeping the distance number for the color area to be the distance number assigned to each of the distance measurement areas included in the color area is not limited to the above-mentioned method. For example, in the color area, if a part or all of average values of chroma of the distance measurement areas each having the same distance number is a threshold value or smaller, the distance number for the color area may be kept to be the distance number assigned to each of the distance measurement areas included in the color area. In other words, in addition to the processes described above in this embodiment, the distance number for the color area having the chroma of the threshold value or smaller may be kept to be the distance number assigned to each of the distance measurement areas included in the color area.

Note that, the embodiment has been described as merely an example of an embodiment for carrying out the present invention, and a technical scope of the present invention should not be interpreted in a limited manner by this embodiment. In other words, the present invention can be carried out in various modes without deuniting from the technical idea or main feature thereof.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277035, filed Dec. 19, 2012, which is hereby incorporated by reference herein in its entirety.

What is claimed is:

1. An image processing apparatus, including at least one of a Central Processing Unit (CPU) or a Micro Processing Unit (MPU), implementing a first classification unit, a second classification unit and a division unit, comprising:
the first classification unit configured to classify image data into a plurality of first areas based on a signal value of each pixel of the image data;
the second classification unit configured to classify the image data into a plurality of second areas based on distance information; and
the division unit configured to divide at least one of the plurality of first areas into a plurality of areas based on the plurality of second areas,
wherein the division unit determines, in a case where two or more second areas overlap with one of the plurality of first areas, whether or not to divide the one of the plurality of first areas into the plurality of areas based on ratio of a planar dimension of at least one of the two or more second areas to a planar dimension of the one of the plurality of first areas.

2. An image processing apparatus according to claim 1, wherein the signal value of each pixel comprises a signal value of one of a hue and a luminance of the each pixel.

3. An image processing apparatus according to claim 2, wherein if a chroma of the one of the plurality of first areas is a threshold value or smaller, the division unit divides the one of the plurality of first areas in accordance with the two or more second areas overlapping with the one of the plurality of first areas.

4. An image processing apparatus according to claim 1, wherein the second classification unit classifies the image data into the plurality of second areas by grouping of distance information on a photographing target, which is obtained for each of a plurality of areas that are obtained by dividing the image data and determines a representative distance for each group.

5. An image processing apparatus according to claim 4, wherein the division unit determines, in a case where the two or more second areas overlap with the one of the plurality of first areas and a ratio of the largest planar dimension of the planar dimensions of the two or more second areas to the planar dimension of the one of the plurality of first areas is larger than a threshold value, the representative distance corresponding to one of the two or more second areas that has the largest planar dimension as the distance information on the one of the plurality of first areas.

6. An image processing apparatus according to claim 4, wherein the division unit determines, in a case where the two or more second areas overlap with the one of the plurality of first areas and a ratio of the largest planar dimension of the planar dimensions of the two or more second areas to the planar dimension of the one of the plurality of first areas is larger than a threshold value, the representative distance corresponding to any one of the two or more second areas as the distance information on the at least one of the plurality of first areas.

7. An image processing apparatus according to claim 1, wherein the division unit determines not to divide the one of the plurality of first areas into the plurality of areas, in a case a ratio of the largest planar dimension of the planar dimensions of the two or more second areas to the planar dimension of the one of the plurality of first areas is larger than a threshold value.

8. An image processing apparatus according to claim 7, wherein the division unit determines to divide the one of the plurality of first areas into the plurality of areas, in a case the ratio of the largest planar dimension of the planar dimensions of the two or more second areas to the planar dimension of the one of the plurality of first areas is equal or smaller than the threshold value.

9. An image processing method, comprising:
a first classification step, performed by at least one of a Central Processing Unit (CPU) or a Micro Processing Unit (MPU), of classifying image data into a plurality of first areas based on a signal value of each pixel of the image data;

a second classification step, performed by at least one of the CPU or the MPU, of classifying the image data into a plurality of second areas based on distance information; and a division step, performed by at least one of the CPU or the MPU, of dividing at least one of the plurality of first areas into a plurality of areas based on the plurality of second areas, wherein the division step determines, in a case where two or more second areas overlap with one of the plurality of first areas, whether or not to divide the one of the plurality of first areas into the plurality of areas based on ratio of a planar dimension of at least one of the two or more second areas to a planar dimension of the one of the plurality of first areas.

10. A non-transitory computer-readable storage medium storing a program for causing a computer to function, to control an image processing apparatus, as:

a first classification unit configured to classify image data into a plurality of first areas based on a signal value of each pixel of the image data;

a second classification unit configure to classify the image data into a plurality of second areas based on distance information; and a division unit configured to divide at least one of the plurality of first areas into a plurality of areas based on the plurality of second areas, wherein the division unit determines, in a case where two or more second areas overlap with one of the plurality of first areas, whether or not to divide the one of the plurality of first areas into the plurality of areas based on ratio of a planar dimension of at least one of the two or more second areas to a planar dimension of the one of the plurality of first areas.

* * * * *